Patented June 2, 1925.

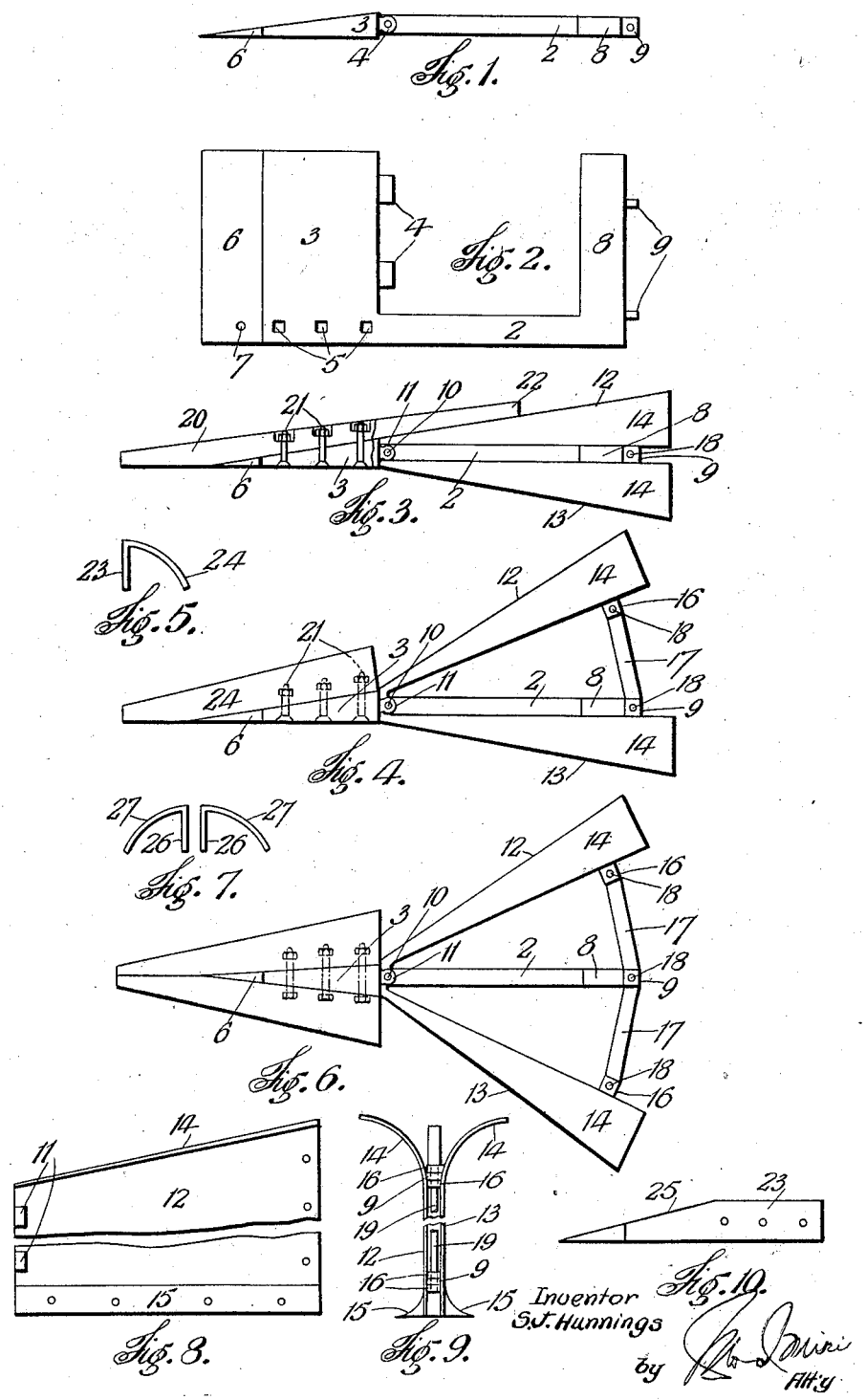

1,540,732

UNITED STATES PATENT OFFICE.

SIDNEY JAMES HUNNINGS, OF URANA, NEW SOUTH WALES, AUSTRALIA.

PLOW.

Application filed October 24, 1922. Serial No. 596,593.

*To all whom it may concern:*

Be it known that I, SIDNEY JAMES HUNNINGS, a subject of the King of Great Britain and Ireland, resident of Urana, a post town in the State of New South Wales, Commonwealth of Australia, have invented certain new and useful Improvements in Plows, of which the following is a specification.

This invention relates to plows and has for its object to increase their utility and efficiency in such a manner that the necessity of obtaining different plows for different classes of work is obviated. In addition, the draft is reduced, an implement is more easily manipulated, and the field when plowed is more free from lumps and ridges. A plow according to the invention does not readily ride out of hard ground and can be adapted to various classes of work, such as drain making, in addition to ordinary plowing.

Referring to the drawings:—

Figure 1 shows in plan a plow according to the invention.

Figure 2 is a side elevation of Figure 1.

Figure 3 shows in part sectional plan a plow having a share attached for use in ground containing roots and having mold and land boards folded against the plow.

Figure 4 is a plan of a plow carrying a share, and showing the mold board outswung into operative position. The land board is folded against the plow.

Figure 5 is a cross section of the share seen in Figure 4.

Figure 6 is a plan of a plow carrying a double share of the kind seen in Figure 5, and showing both mold and land boards outswung into operative position.

Figure 7 is a cross section of the share seen in Figure 6.

Figure 8 is a side elevation of a mold board. The land board is of the same construction.

Figure 9 is an end elevation of a plow having the mold and land boards folded in against the same.

Figure 10 is a side elevation of the kind of share seen in Figures 4 and 5.

The invention comprises a base or body portion 2 having an upstanding breast portion 3 provided with hinge lugs 4 and having holes indicated at 5 to provide for the attachment of a share. In advance of the breast 3 is a cutting portion 6 having a hole, indicated at 7, for the attachment of a share. The portion 6 may be integral with the breast 3 but preferably is bolted or otherwise attached thereto in order to provide for renewal. Also upstanding from the base or body portion 2 is an upright 8 having lugs 9 outstanding therefrom.

Pivoted by a pin 10 to the lugs 4 are the hinge lugs 11 of a mold board 12 and a land board 13. The mold and land boards are each provided with an overhanging or curved upper end 14 rising from front to rear as seen in Figure 8, and of increasing width rearwardly as seen in Figures 3, 4 and 6. Secured to the lower end of edge of each of the boards 12 and 13 is a cutter 15. Carried by each of the boards 12 and 13 are link lugs 16. Retaining the mold and land boards in correct operative position are links 17 extending between the lugs 9 and 16 and secured thereto by removable pins 18. By removing the links 17 the mold and land boards or either of them may be outswung and retained in operative position. When the boards 12 and 13 are folded against the plow they may be retained by a pin or bolt 19.

Under some conditions, such as in soil containing heavy grass, roots or the like, a share 20 is secured by bolts 21 to the breast 3 and is preferably provided with an extension 22.

Under other conditions a share having a vertical portion 23 and a quadrant shaped or curved wing 24 is attached by the bolts 21. The wing 24 is inclined downwardly towards its front end as at 25 in Figure 10.

In another modification the breast 3 is V-shaped in plan as seen in Figure 6 and a double share having a vertical portion 26 and a quadrant. Shaped or curved wing 27 at each side of the breast is provided. The tapered breast 3 is here shown as used with two single shares, and it is apparent that it could, with equal facility, be used with a single share and its relative moldboard, thereby providing a plow either right or left handed as the case may be.

It will be seen that with this invention the cutting portion 6 corresponds to a colter. By attaching different shares various classes of work may be performed. The mold and land boards 12 and 13 may be adjusted according to the work. The holes indicated in Figure 8 provide for bolting on extension pieces to the mold or land boards.

Any suitable framework may be employed, if desired, for the attachment of draft devices and analogous fittings in common use. Further the invention in any of its forms may be duplicated or multiplied in a common framework, for fallowing or making fire breaks for example, as will be well understood by those acquainted with the art.

What I claim is:—

A plow having a body portion, an upstanding breast portion arranged at one end thereof and extending above the body portion, said upstanding breast portion being formed with openings to permit the attachment of a share thereto, a cutting portion arranged in advance of the breast portion, said cutting portion being formed with an opening to receive a share fixing means, an upright extending from the rear of the body portion and substantially equal in height to that of the breast portion, means for pivotally connecting a mold board and a land board to the rear of the breast portion above the body portion, and links carried by the rear edge of the upright to engage and position the rear ends of the mold board and land board.

In testimony whereof, I have signed my name to this specification in the presence of two subscribing witnesses.

SIDNEY JAMES HUNNINGS.

Witnesses:
　THOS. W. YOUNG,
　G. BARRIE.